US009888389B2

(12) United States Patent
Bendlin et al.

(10) Patent No.: US 9,888,389 B2
(45) Date of Patent: Feb. 6, 2018

(54) METHOD AND APPARATUS FOR TRANSMITTING LTE WAVEFORMS IN SHARED SPECTRUM BY CARRIER SENSING

(71) Applicant: TEXAS INSTRUMENTS INCORPORATED, Dallas, TX (US)

(72) Inventors: Ralf Matthias Bendlin, Plano, TX (US); Anthony Edet Ekpenyong, Houston, TX (US); Pierre Bertrand, Antibes (FR); Brian F. Johnson, Kensington, MD (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/227,406

(22) Filed: Aug. 3, 2016

(65) Prior Publication Data
US 2016/0345181 A1    Nov. 24, 2016

Related U.S. Application Data

(63) Continuation of application No. 14/718,593, filed on May 21, 2015, now Pat. No. 9,532,230.

(60) Provisional application No. 62/008,032, filed on Jun. 5, 2014.

(51) Int. Cl.
| *H04W 16/14* | (2009.01) |
| *H04W 72/08* | (2009.01) |
| *H04W 74/08* | (2009.01) |
| *H04W 72/04* | (2009.01) |
| *H04W 36/00* | (2009.01) |

(52) U.S. Cl.
CPC ....... *H04W 16/14* (2013.01); *H04W 72/0413* (2013.01); *H04W 72/082* (2013.01); *H04W 74/0816* (2013.01); *H04W 36/0055* (2013.01)

(58) Field of Classification Search
CPC ............. H04W 16/04; H04W 72/0413; H04W 72/082; H04W 74/0816
USPC ........................................................ 455/454
See application file for complete search history.

(56) References Cited

U.S. PATENT DOCUMENTS

| 9,532,230 B2* | 12/2016 | Bendlin ............ H04W 72/0413 |
| 2009/0209265 A1 | 8/2009 | Kwon et al. |
| 2011/0116401 A1 | 5/2011 | Banerjea et al. |
| 2011/0305156 A1 | 12/2011 | Liu et al. |
| 2012/0039284 A1 | 2/2012 | Barbieri et al. |
| 2013/0039171 A1 | 2/2013 | Gaal et al. |
| 2013/0322279 A1 | 12/2013 | Chincholi et al. |
| 2013/0322371 A1 | 12/2013 | Prakash et al. |
| 2015/0223244 A1 | 8/2015 | Tabet et al. |

(Continued)

FOREIGN PATENT DOCUMENTS

EP    2696530    12/2014

*Primary Examiner* — Michael Neff
(74) *Attorney, Agent, or Firm* — Ronald O. Neerings; Charles A. Brill; Frank D. Cimino (57) ABSTRACT

A method of operating a long term evolution (LTE) communication system on a shared frequency spectrum is disclosed. A user equipment (UE) is initialized on an LTE frequency band. A base station (eNB) monitors the shared frequency spectrum to determine if it is BUSY. The eNB transmits to the UE on the shared frequency spectrum if it is not BUSY. The eNB waits for a first time if it is BUSY and directs the UE to vacate the shared frequency spectrum after the first time.

22 Claims, 4 Drawing Sheets

(56) References Cited

U.S. PATENT DOCUMENTS

2016/0066215 A1    3/2016    Yang et al.

* cited by examiner

METHOD AND APPARATUS FOR TRANSMITTING LTE WAVEFORMS IN SHARED SPECTRUM BY CARRIER SENSING

This application is a Continuation of application Ser. No. 14/718,593 filed May 21, 2015, which claims the benefit under 35 U.S.C. §119(e) of Provisional Appl. No. 62/008,032, filed Jun. 5, 2014, which is incorporated herein by reference in its entirety.

BACKGROUND OF THE INVENTION

In most countries, access to radio frequency spectrum is tightly regulated through government agencies such as the Federal Communications Commission (FCC) in the United States or the European Commission in the European Union. Like any other natural resource, the frequencies that make up the radio spectrum need to be shared among its users. Parts of the radio spectrum, so-called bands, are thus either licensed to individual users, such as mobile operators, or shared among many users as is the case with WiFi or Bluetooth which operate in unlicensed bands. In addition, certain hybrid models exist where licensed spectrum is granted to a primary user, for instance for naval radar applications, who has the highest priority. In addition, secondary users are allowed to use the licensed band during periods of inactivity during which the primary user does not transmit waveforms in the band under consideration. These secondary users may have a different priority. For example, a given frequency band licensed to a primary user could be used by the public safety community for mission critical communications. In this case, commercial users could be allowed to use such a band and only if both the primary and the secondary user of higher priority, i.e. a public safety user, do not occupy the band. Such policy based spectrum usage is sometimes referred to as Authorized Shared Access (ASA). From this perspective, there is no need to distinguish between unlicensed and authorized shared access as the same techniques can be used to ensure fairness and policy compliance whenever a band is used by many users.

In the above example of authorized shared access, spectrum sharing can be facilitated by dynamic schemes, sometimes referred to as listen-before-talk (LBT) schemes, as well as semi-static schemes, such as through geolocation databases (GLDB). Such databases, for example, can map frequency usage of certain bands to geographic areas or times of day. Due to the time it takes to update and propagate these databases to all participating users, they cannot change dynamically. As the name suggests, LBT schemes are more dynamic and do not rely on semi-statically configured databases. Rather, a secondary user has to ensure that the primary user or other user of equal priority is not interfered with by its transmission. Two well-known examples are radar avoidance and Carrier Sense Multiple Access with Collision Avoidance (CSMA/CA) in IEEE 802.11 Wireless Local Area Networks (WLANs). The former applies to the case when there is a primary user, to which a secondary user must grant priority. Since the secondary must cease transmission when it detects a military, meteorological or automotive radar waveform, it is often referred to as Dynamic Frequency Selection (DFS). In other words, the secondary user vacates a given band or channel (channels are further subdivisions of bands) upon detection of a primary user and tries to transmit on a different band or channel giving rise to the name dynamic frequency selection. Similarly, in the case of CSMA/CA, when the transmitter detects an ongoing transmission of equal priority, it chooses not to transmit in order to try again at a later point in time. Hence the name carrier sense multiple access with collision avoidance. The two main differences between DFS and CSMA/CA, therefore, are the time scale at which the sensing occurs and the action the transmitter takes when an on-going transmission is detected. For example, a DFS transmitter will always have to switch channels/bands in order to vacate the current one for the primary user, whereas a CSMA/CA transmitter may or may not switch the channel. This is because in CSMA/CA the radio resources are shared among users of equal priority, and it is considered a multiple access scheme. With DFS, however, the primary user has higher priority. Consequently, in order to guarantee competitive latencies of CSMA/CA schemes, the carrier sensing (CS) and collision avoidance (CA) occurs in the order of tens of microseconds (μs) whereas DFS may take seconds.

CS/CA multiple access schemes stand in stark contrast to other common multiple access techniques such as Time Division Multiple Access (TDMA), Frequency Division Multiple Access (FDMA), Code Division Multiple Access (CDMA), or Orthogonal Frequency Division Multiple Access (OFDMA) due to the opportunistic random access nature by which the medium is shared. TDMA and FDMA in the Global System for Mobile Communications (GSM), CDMA in the Universal Mobile Telecommunications System (UMTS), and Orthogonal Frequency-Division Multiple Access (OFDMA) in the 3rd Generation Partnership Project (3GPP) Long Term Evolution (LTE)) try to orthogonalize the available resources to share them among multiple users. Orthogonal operation, however, requires precise coordination through predefined rules or a dynamic scheduler which assigns resources to particular users for a given period of time in a given part of the radio frequency spectrum such that collisions are inherently prevented. This makes it particularly challenging to operate them in radio resources which are shared by means of CS/CA multiple access schemes, since users following those kinds of protocols and procedures would lose to users following predefined schedules or radio resource assignments according to their protocols and procedures when competing for the available radio resources.

In LTE a base station is known as an evolved NodeB (eNodeB/eNB) and is in full control of the Radio Resource Management (RRM) of a cell under its control. An Evolved Universal Terrestrial Radio Access Network (E-UTRAN) generally comprises of many eNodeBs each with its own RRM function. A subset of these eNodeBs can coordinate their RRM through the X2 Application Protocol (X2AP) which is defined on the X2 interface connecting two eNodeBs. Similarly, each eNodeB is connected to one or more of the Mobility Management Entities (MMEs) in the Core Network (CN) via the S1 interface on which the S1 Application Protocol (S1AP) is defined. The S1AP can be used for RRM coordination as well. RRM interfaces are an integral part of cellular communications as they allow important functions such as interference coordination, mobility, or even Self-Organizing Networks (SONs).

Figure 1:
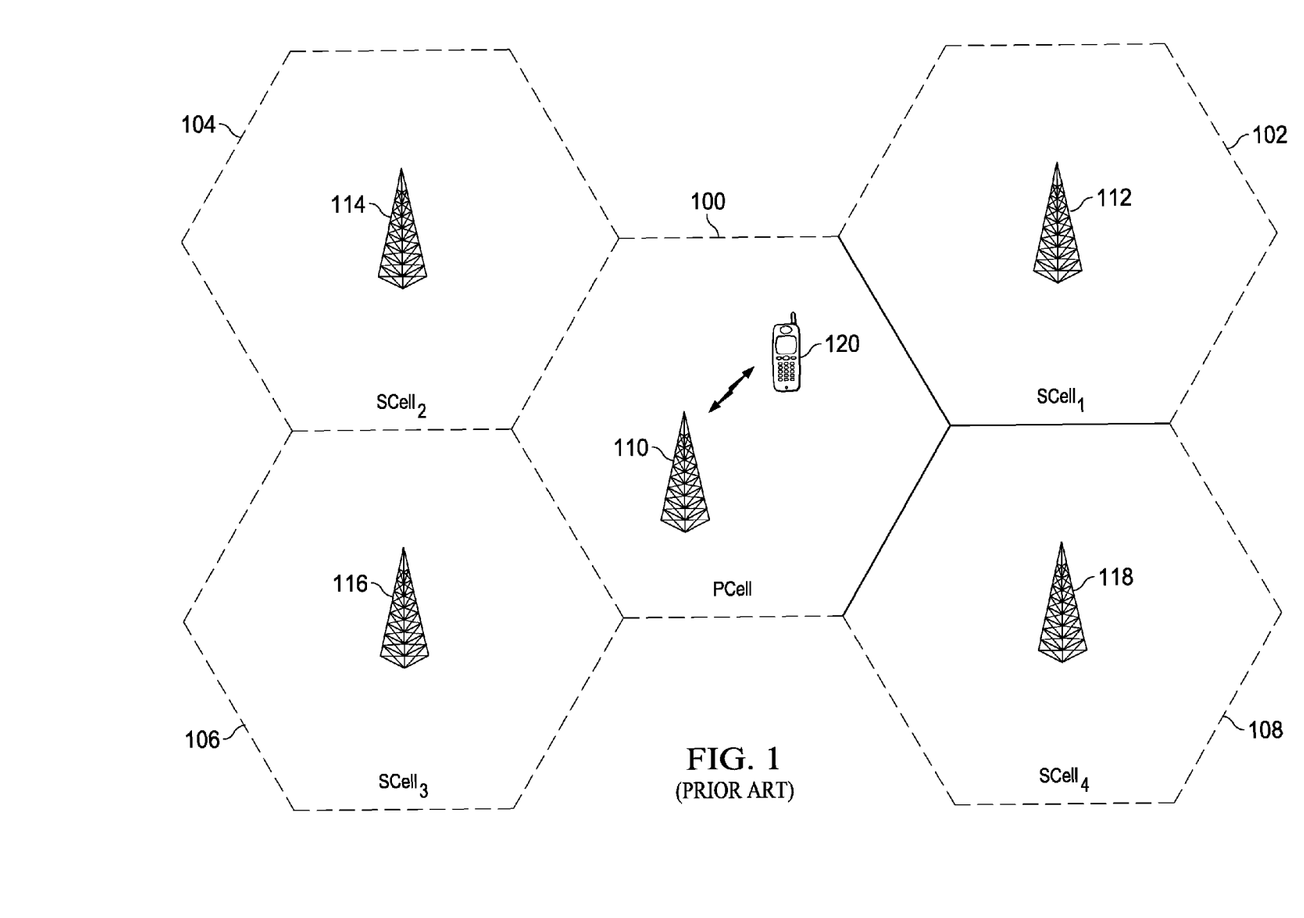
FIG. 1 is a diagram of a long term evolution (LTE) communication system of the prior art.

FIG. 1 is an exemplary wireless telecommunications network of the prior art. The illustrative telecommunications network includes primary eNodeB 110 operating in primary cell (PCell) 100 and eNodeBs 112, 114, 116, and 118 operating in secondary cells (SCell$_1$ through SCell$_4$) 102, 104, 106, and 108, respectively. A handset or other user equipment (UE) 120 is shown in communication with eNodeB 110 of PCell 100. UE 120 may also be in communication with one or more eNodeBs of the secondary cells. Here, SCell is a logical concept. For example, eNodeB 110 could operate a plurality of SCells 102 through 108.

In addition, eNodeB 110 is in control of the radio resources in its cell 100 by means of the Radio Resource Control (RRC) protocol as well as the multiple access of the users connected to its cell by means of the Medium Access Control (MAC) protocol. The RRC protocol, for instance, configures the carriers of which a User Equipment (UE) can transmit and receive data and up to five so-called Component Carriers (CCs) can be configured per UE in LTE Advanced (LTE-A). Similarly, the MAC protocol in conjunction with the RRC protocol controls how and when the UE can use the available radio resources to transmit or receive data on a configured carrier. LTE Release 10 introduces a feature called Carrier Aggregation in which a UE can be configured with one primary cell (PCell) and up to four secondary cells (SCells). A PCell can only be changed through a handover, whereas SCells are configured through RRC signaling. In particular, a UE is not expected to receive system information by decoding the Physical Broadcast Channel (PBCH) on a Secondary Component Carrier (SCC) or to monitor the common search space of an SCell to receive Physical Downlink Control Channels (PDCCHs) whose CRC is scrambled by the SI-RNTI in order to receive System Information (SI) on the Downlink Shared Channel (DI-SCH). Moreover, the UE may assume that the System Frame Number (SFN) on all SCCs is aligned with the SFN of the Primary Component Carrier (PCC).

CA does not define Radio Link Monitoring (RLM) of an SCell. As such, there is no specified means for the UE Physical layer (PHY) to indicate a Radio Link Failure (RLF) to the UE higher layers through the MAC layer. This is because in the Evolved Universal Terrestrial Radio Access (E-UTRA) one can always rely on the connectivity provided by the PCell which provides robustness through RLM and other fallback procedures. Alternatively, one may think of SCells as supplementary serving cells which can be activated in case additional capacity is needed for data communication with the UE. To this end, the MAC layer can activate configured SCells through a MAC Control Element (CE). An SCell activation can take between 8-30 ms depending on the synchronization status of the UE with respect to that SCC. An RRC reconfiguration of an SCell would take significantly longer, especially when the UE needs to perform an inter-frequency measurement. The eNodeB may thus configure a UE to periodically measure the Reference Signal Received Power (RSRP) of certain cells on certain carriers and to report the measurements either periodically or triggered through configurable offsets and thresholds. In the 3GPP Long Term Evolution this is achieved through RRC signaling of measurement objects and configurations. If measurements are readily available at the eNodeB, an RRC reconfiguration of an SCell or PCell can be dramatically reduced in latency from seconds to tens or hundreds of milliseconds. Note that while the eNodeB can only activate cells that are already configured as SCells, it can configure a UE to measure the RSRP on any cell. On the other hand, the eNodeB can use the measurement report of any cell to either activate a cell, as in the case of SCell activations, or to RRC reconfigure the UE to add/remove SCells or even to change the PCell.

Once a PCell or SCell is activated, the eNodeB MAC scheduler assigns downlink (DL) and uplink (UL) grants to a UE for downlink and uplink transmissions on the Physical Downlink Shared Channel (PDSCH) and Physical Uplink Shared Channel (PUSCH), respectively. In the downlink direction, a grant received in the Downlink Control Information (DCI) in subframe n schedules a corresponding PDSCH transmission in the same subframe whereas in the uplink, it schedules PUSCH transmissions in subframe n+k, where k>0 is determined through pre-specified rules.

It is worth reiterating that the E-UTRAN, in particular, the eNodeB, is in full control of all radio resources at least for UEs in RRC_CONNECTED mode and that, with the exception of the Physical Random Access Channel (PRACH), it controls all transmissions in both the uplink and downlink direction including resource assignment in time, frequency, or any other means such as CDMA as well as timing or power control of a transmission.

Even though the RRM function resides in the eNodeB, which in turn controls all radio resources through RRC, it relies on the UE to discover cells and report associated measurements. To this end, in LTE Releases 8 through 11, the eNodeB transmits a Primary Synchronization Signal (PSS), a Secondary Synchronization Signal (SSS), and a Cell-specific Reference Signal (CRS) in each radio frame. The PSS and SSS each occupy one OFDM symbol per half-frame whereas the CRS is transmitted in each subframe of a radio frame thus allowing a UE to discover and measure cells within a measurement window of 6 ms without a-priori knowing the timing of a given cell. Furthermore, to support inter-frequency measurements in Time Division Duplex (TDD) systems when the UL/DL configuration of a cell may not be known to a UE or to support measurement restrictions introduced in LTE Rel. 10 for the purpose of enhanced Inter-cell Interference Coordination (eICIC), a UE must be able to discover cells in just one subframe and potentially the DwPTS region of a special subframe. In order to facilitate energy savings and interference reduction, LTE Release 12 introduces "discovery bursts" comprising PSS, SSS, and CRS transmissions and, if configured, Channel State Information Reference Signals (CSI-RS) for transmission point (TP) identification in shared cell ID scenarios. For example, multiple TPs may share the same physical cell ID and may only be discerned by their respective CSI-RS resource element (RE) configuration. PSS, SSS, CRS and CSI-RS (if configured) make up the Discovery Reference Signals (DRS) and are transmitted during DRS occasions. DRS occasions are similar to LTE Release 9 Positioning Reference Signal (PRS) occasions in that they have a configured or specified length (i.e. number of subframes) and periodicity. Ideally, the length of a DRS occasion does not exceed the UE measurement window of 6 ms and could be as short as one subframe. Reasonable periodicities for DRS occasions are hundreds of milliseconds and DRS bursts can be thought of as beacons in other wireless communication systems such as CSMA/CA.

BRIEF SUMMARY OF THE INVENTION

In a first preferred embodiment of the present invention, there is disclosed a method of operating a long term evolution (LTE) communication system on a shared frequency spectrum. A base station (eNB) initializes a user equipment (UE) on an LTE frequency band. The eNB monitors the shared frequency spectrum to determine if it is BUSY. The eNB transmits to the UE on the shared frequency spectrum if it is not BUSY. The eNB waits for a first time if it is BUSY. The eNB directs the UE to vacate the shared frequency spectrum after the first time.

In a second preferred embodiment of the present invention, there is disclosed a method of operating a long term evolution (LTE) communication system on a shared frequency spectrum. A base station (eNB) initializes a user equipment (UE) on an LTE frequency band. The UE monitors the shared frequency spectrum to determine if it is BUSY. The UE transmits to the eNB on the shared frequency spectrum if it is not BUSY. The UE waits for a first time if it is BUSY. The UE reports the BUSY condition to the eNB after the first time.

DETAILED DESCRIPTION OF THE INVENTION

The present invention is directed to an apparatus and method of operation of an Orthogonal Frequency-Division Multiple Access (OFDMA) cellular communications system such as the 3GPP Long Term Evolution (LTE) in radio frequencies shared with a primary transceiver. The primary transceiver may be a naval, automotive radio, or other transceiver of higher priority. Many modifications and other embodiments of this invention will come to mind to one skilled in the art to which the invention pertains having the benefit of the teachings presented in the descriptions and the associated drawings. Therefore, it is to be understood that the present invention is not limited to the specific embodiments disclosed. Although specific terms are employed herein, they are used in a generic and descriptive sense only and not for purposes of limitation.

The following abbreviations are used throughout the instant specification.

ASA: Authorized Shared Access
eNB: evolved Node B or base station
UE: User Equipment
CQI: Channel Quality Indicator
CRS: Cell-specific Reference Signal
CSI: Channel State Information
CSI-RS: Channel State Information Reference Signal
CSMA/CA: Carrier Sense Multiple Access with Collision Avoidance
DCI: Downlink Control Information
DFS: Dynamic Frequency Selection
DRS: Discovery Reference Signal
DL: DownLink
DwPTS: Downlink Pilot Time Slot
E-UTRAN: Evolved Universal Terrestrial Radio Access Network
LBT: Listen Before Talk
LTE: Long Term Evolution
MAC: Medium Access Control protocol
MIMO: Multiple-Input Multiple-Output
OFDMA: Orthogonal Frequency Division Multiple Access
OOR: Out Of Range
PBCH: Physical Broadcast Channel
PCell: Primary Cell
PCFICH: Physical Control Format Indicator Channel
PDCCH: Physical Downlink Control Channel
PDSCH: Physical Downlink Shared Channel
PHICH: Physical Hybrid ARQ Indicator Channel
PMCH: Physical Multicast Channel
PSS: Primary Synchronization Signal
PUCCH: Physical Uplink Control Channel
PUSCH: Physical Uplink Shared Channel
RI: Rank Indicator
RRC: Radio Resource Control
RRM: Radio Resource Management
RSRP: Reference Signal Received Power
SCell: Secondary Cell
SRS: Sounding Reference Signal
SSS: Secondary Synchronization Signal
TDD: Time Division Duplex
TRS: Tracking Reference Signal
UL: UpLink
Dynamic Frequency Selection (DFS)

The 3GPP Long Term Evolution (LTE) communications standard cannot be readily deployed in shared access spectrum. This is because the radio resource management function resides in, and the radio resources are solely controlled by, the eNodeBs in the network. Dynamic Frequency Selection (DFS) schemes typically allow sufficient time (e.g. several seconds) to change a frequency band or carrier upon detection of a primary user. Thus, handover based RRC signaling and SCell activation or deactivation under MAC control are sufficient to vacate a band for a primary user. The 3GPP LTE communications standard currently lacks protocols, procedures and measurements that would let a UE take any action in case a primary user is detected on a carrier on which the UE is configured to transmit data. Furthermore, mobility control in LTE is fully controlled by the eNodeB, although other wireless cellular communications standards do allow UEs to initiate handovers. Mobility here incorporates the case of load balancing where the eNodeB may add or remove SCells or change the PCell for stationary UEs. For both ASA based schemes with a primary user and CSMA/CA based schemes without a primary user, so called "hidden stations" may exist Hidden stations are transmitters such as primary users, whose transmissions can only be detected at the receiving end of a communications link which shares the wireless medium. In LTE, for example, only the UE may detect waveforms transmitted from a "hidden station" whereas the eNodeB is completely oblivious to the existence of the hidden station.

Figure 2:
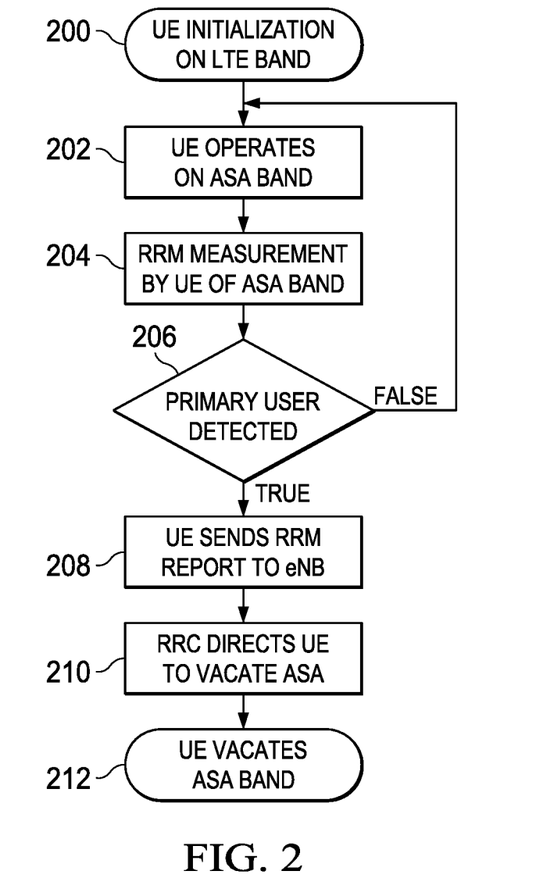
FIG. 2 is a flow diagram showing operation of a long term evolution (LTE) communication system on an authorized shared access (ASA) frequency spectrum.

Referring to FIG. 2, there is a diagram showing operation a first embodiment of the present invention. A UE is initialized at step 200 to operate in conjunction with a PCell on an LTE band. An ASA band is configured and operated as a regular LTE band by the eNodeB, and the UE operates on the ASA band 202. UEs are barred from camping on cells operating in the ASA band through existing means, such as barring through broadcast of system information. Consequently, all UEs connected on the ASA band are in RRC_CONNECTED mode and thus under full control of an eNodeB. The eNodeB configures all UEs connected on the ASA band to perform RRM measurements 204 as per existing LTE specifications (e.g. Releases 8 through 12).

DFS is supported by each UE through non-standardized (proprietary) implementations. If a UE detects a hidden station (from the UE perspective, all primary users are hidden stations) 206, the UE Physical Layer (PHY) indicates to the higher layers of its protocol stack to trigger an RRM measurement report as per existing LTE Rel. 8/9/10/11/12 procedures. Through specification, a "DFS event," for example, an RRM measurement report triggered through the non-standardized (proprietary) DFS function at the UE would be tied to a specific value of the RRC Information Element (IE) RSRP-Range. For example, a DFS event could be indicated by the lowest value in the RRC IE RSRP-Range and could be thought of as an Out-of-Range (OOR) indication. The UE would use existing RRM measurement reporting procedures to report the DFS event (i.e., the RSRP measurement report with the OOR indicator signifying the DFS event) to the eNodeB 208. The eNodeB RRM function would re-interpret the RSRP measurement report as a DFS/OOR event as per the standardized linkage and subsequently, to vacate the ASA band 210 for the primary user, and would reconfigure the UE via existing RRC signaling 212. Such RRC signaling encompasses handovers in the case of PCells or SCell reconfigurations in the case of SCells. Alternatively, if the RRM function at the eNodeB believes the ASA band needs to be only temporarily vacated for the primary user, it could simply let the sCellDeactivationTimer at the UE expire, or it can send a deactivation command in a MAC control element in order to deactivate an SCell configured on the ASA band. 3GPP LTE specifications would introduce performance requirements that can be used to test UEs if they report DFS/OOR events according to requirements put forward by regulatory bodies worldwide for each ASA band but no new measurements would be defined in the specifications to support DFS in 3GPP LTE.

In another embodiment of the present invention, instead of re-interpreting an existing measurement report as DFS/OOR event, a new measurement report and associated procedures are defined specifically for the purpose of indicating to the E-UTRAN the existence of a hidden station or primary user. All UEs connected to cells on an ASA band would be configured to measure and report this new DFS measurement. The eNodeB RRC layer can configure UEs to report the DFS measurement either periodically or triggered, or periodically triggered. The eNodeB would configure measurement events and associated thresholds and offsets to control the DFS measurement reporting of UEs connected on ASA bands. The exact measurement procedure would thus be determined by specification. However, the actions taken by the network could be similar to those in the previous embodiment above to include UE handover, SCell reconfiguration, and SCell deactivation. Reporting a measurement rather than binary information would let the eNodeB RRM function learn from historical data and let it apply its own threshold for improved protection of the primary user. Since the eNodeB can analyze and combine DFS measurements from various UEs connected to it, the decision to select a different carrier for a given UE ultimately resides at the eNodeB. However, if the decision is made at each UE, the network would have to follow whatever a UE indicates in order to guarantee protection of a potential primary user.

Carrier Sense Multiple Access with Collision Avoidance (CSMA/CA)

Figure 3:
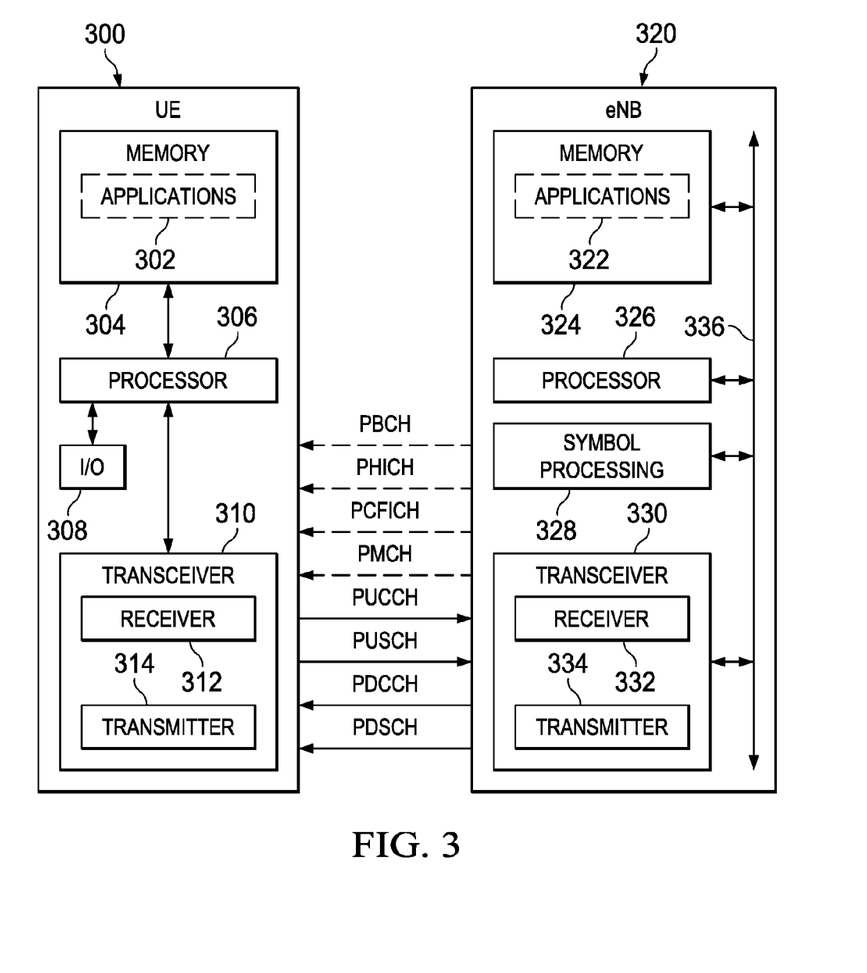
FIG. 3 is a diagram showing communication between a user equipment (UE) and a base station (eNB) according to the present invention.

Turning now to FIG. 3, there is a diagram showing communication between UE 300 and eNodeB 320 according to the present invention. UE 300 may be a cell phone, computer, or other wireless network device. UE 300 includes a processor 306 coupled to a memory 304 and a transceiver 310. Processor 306 may include several processors adapted to various operational tasks of the UE including signal processing and channel measurement and computation. The memory stores application software 302 that the processor may execute as directed by the user as well as operating instructions for the UE. Processor 306 is also coupled to input/output (I/O) circuitry 308, which may include a microphone, speaker, display, and related software. Transceiver 310 includes receiver 312 and transmitter 314, suitable for wireless communication with eNodeB 320. Transceiver 310 typically communicates with eNB 320 over various communication channels. For example, transceiver 310 sends uplink information to eNodeB 320 over physical uplink control channel PUCCH and physical uplink shared channel PUSCH. Correspondingly, transceiver 310 receives downlink information from eNodeB 320 over physical downlink control channel PDCCH and physical downlink shared channel PDSCH.

Base station 320 includes a processor 326 coupled to a memory 324, a symbol processing circuit 328, and a transceiver 330 via bus 336. Processor 326 and symbol processing circuit 328 may include several processors adapted to various operational tasks including signal processing and channel measurement and computation. The memory stores application software 322 that the processor may execute for specific users as well as operating instructions for eNodeB 320. Transceiver 330 includes receiver 332 and transmitter 334, suitable for wireless communication with UE 300. Transceiver 330 typically communicates with UE 300 over various communication channels. For example, transceiver 330 sends downlink information to UE 300 over physical downlink control channel PDCCH and physical downlink shared channel PDSCH. Transceiver 330 also sends special downlink information to UE 300 over physical broadcast channel PBCH, physical hybrid ARQ indicator channel PHICH, physical control format indicator channel PCFICH, and physical multicast channel PMCH. Correspondingly, transceiver 330 receives uplink information from UE 300 over physical uplink control channel PUCCH and physical uplink shared channel PUSCH.

According to the present invention, E-UTRAN cells such as eNodeB 320 may be deployed in unlicensed or ASA bands where LTE user equipment shares the radio resources with other users of equal priority but which follow strict Carrier Sense Multiple Access with Collision Avoidance (CSMA/CA) procedures/protocols. There is a fundamental problem in that the 3GPP Long Term Evolution was specifically designed to operate in licensed spectrum.

Figure 4A:
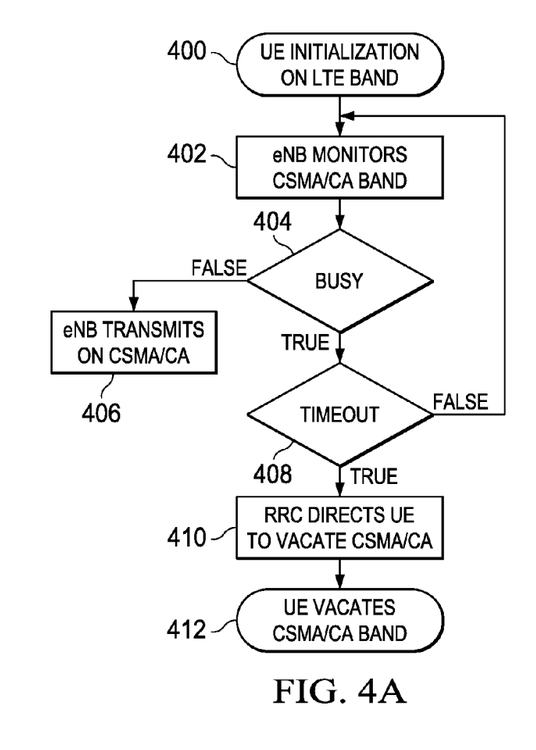
FIG. 4A is a flow diagram showing downlink operation of a long term evolution (LTE) communication system on a Carrier Sense Multiple Access with Collision Avoidance (CSMA/CA) frequency spectrum according to the present invention.

Referring now to FIG. 4A, in the downlink direction the situation is similar to DFS as explained with reference to FIG. 2. Here, CSMA/CA is implemented as a non-standardized proprietary function according to the present invention. The UE is initialized on an LTE band 400. The eNodeB monitors the CSMA/CA band 402. If the eNodeB senses an ongoing transmission 404, it does not transmit any downlink channels. The eNodeB monitors a timeout reference 408 and continues to monitor the CSMA/CA band 402. If the ongoing transmission ends before the timeout reference 408, the eNodeB transmits to the UE on the CSMA/CA band 406. Otherwise, if the timeout reference expires, RRC signaling directs the UE to vacate the CSMA/CA band 410 and initiates a handover 412.

The eNodeB may, however, have to transmit some signals without regard to whether an ongoing transmission is detected. The eNodeB transmits Discovery Reference Signal (DRS) bursts with a periodicity in the order of hundreds of milliseconds. The DRS burst may just be one subframe and comprises at least PSS, SSS, and CRS to allow UEs to discover the cell and perform measurements. For shared cell ID scenarios, CSI-RS may also be transmitted during a DRS occasion. The periodic PSS/SSS transmissions also let UEs obtain coarse time and frequency synchronization with that cell. At the network side, the DRS based RRM measurement reports let the eNodeB decide whether to configure a cell on a certain unlicensed or ASA band for a given UE. In addition to DRS, the eNodeB needs to periodically transmit some kind of Tracking Reference Signal (TRS) with a much smaller periodicity than that of DRS, such as 5 ms or 10 ms. The TRS waveforms let UEs perform Automatic Gain Control (AGC) and fine time and frequency synchronization ("tracking"). Such TRS waveforms may be based on existing CRS waveforms. This would have the additional benefit that it could be used for channel state information acquisition in case of CRS-based transmission modes. Additionally, the eNodeB may periodically transmit Channel State Information Reference Signals (CSI-RS) to allow channel state information acquisition at the UE for CSI-RS based transmission modes. UEs would be configured for CSI measurement and reporting in accordance with the CSI transmissions at the eNodeB.

Referring back to FIG. 3, it may be preferable not to use some downlink channels with CSMA/CA. For example, the Physical Broadcast Channel (PBCH) would not be transmitted in a cell on an unlicensed or ASA band. Accordingly, UEs would not be able to camp on such a cell. Similarly, system information would also not be transmitted. Such cells can thus only be configured as SCells and PCells would always be configured on licensed spectrum. It may also be beneficial not to transmit the Physical Hybrid ARQ Indicator CHannel (PHICH) in unlicensed or ASA spectrum. Alternatively, UL grants transmitted in DCI could serve as implicit ACK/NACK indication by scheduling retransmissions of previous UL grants. The Physical Control Format Indicator Channel (PCFICH) may or may not be transmitted in unlicensed or ASA spectrum. If extended PHICH duration is configured, the Control Format Indicator (CFI) is known through specification. Similarly, the PCFICH is not needed for PDSCH transmissions in transmission mode 10 (TM10) scheduled by an Enhanced Physical Downlink Control Channel (EPDCCH). And for cross-carrier scheduled PDSCH transmissions the CFI is known through configuration. On the other hand, since the PCFICH is transmitted in the same subframe as a PDCCH it could be transmitted whenever a PDCCH is transmitted. Finally, since the Physical Multicast Channel (PMCH) is scheduled semi-statically by the MBMS Coordination Entity (MCE) on reserved resources, it may be beneficial not to transmit the PMCH in unlicensed or ASA spectrum. Otherwise, for unicast downlink transmissions, when the CSMA/CA function at the eNodeB indicates that a given subframe can be used for (E)PDCCH or PDSCH transmissions, the eNodeB transmits as per LTE Release 12. In one embodiment, the CSMA/CA function at the eNodeB returns a binary indication. If the CSMA/CA function for a given cell on a given carrier indicates BUSY, the eNodeB does not transmit (E)PDCCH or PDSCH to any UE. The eNodeB may still transmit other signals or channels as per the above recommendations. Alternatively, if the CSMA/CA function for a given cell on a given carrier indicates IDLE, the eNodeB may transmit (E)PDCCH and/or PDSCH transmissions, the eNodeB transmits as per LTE Release 12.

Figure 4B:
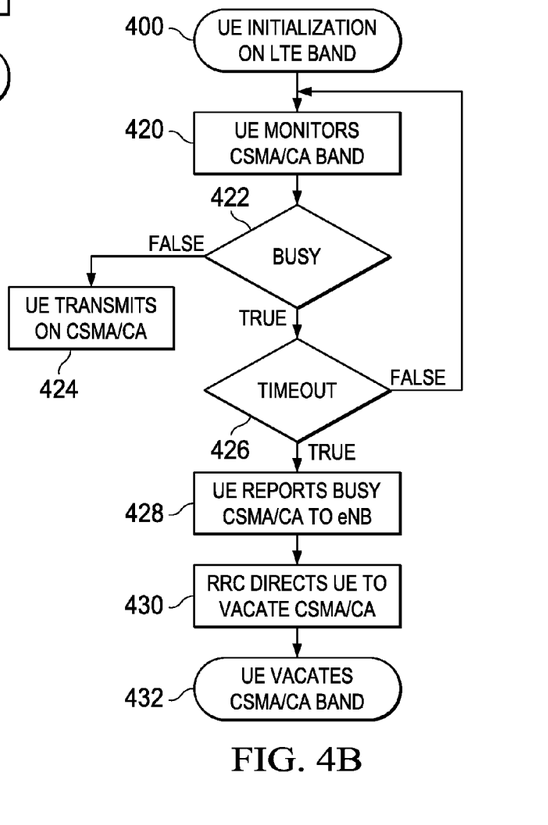
FIG. 4B is a flow diagram showing uplink operation of a long term evolution (LTE) communication system on a Carrier Sense Multiple Access with Collision Avoidance (CSMA/CA) frequency spectrum according to the present invention.

Referring to FIG. 4B, uplink operation on CSMA/CA bands is similar to downlink operation. The UE is initialized on an LTE band 400. The UE monitors the CSMA/CA band 420. If the UE senses an ongoing transmission 422, it does not transmit any uplink channels. The UE monitors a timeout reference 426 and continues to monitor the CSMA/CA band 420. If the ongoing transmission ends before the timeout reference 426, the UE transmits to the eNodeB on the CSMA/CA band 424. Otherwise, if the timeout reference expires, the UE sends a BUSY report to the eNodeB 428. RRC signaling directs the UE to vacate the CSMA/CA band 430 and initiates a handover 432.

When the CSMA/CA function at the UE indicates that a given subframe cannot be used for uplink transmissions, it may be beneficial to drop any configured Sounding Reference Signal (SRS) transmission in order to not interfere with the ongoing transmission. It may also be beneficial not to transmit the Physical Uplink Control Channel (PUCCH) in unlicensed or ASA spectrum. In this case, the PUCCH is transmitted on the PCell in licensed spectrum only. If PUCCH transmissions are allowed in unlicensed or ASA spectrum, several UE behaviors are envisioned.

In one case, the UE follows existing UE procedures for PUCCH transmissions independent of the indication of the CSMA/CA function at the UE for the subframe for which the PUCCH transmission is scheduled. Collisions with on-going transmissions cannot be avoided in general and the PUCCH may not be properly received at the eNodeB.

Alternatively, the UE could base any PUCCH transmissions on the indication of the CSMA/CA function at the UE for the subframe for which the PUCCH transmission is scheduled. If the CSMA/CA function at the UE indicates BUSY, the UE does not transmit on the PUCCH in the subframe under consideration. Otherwise, if the CSMA/CA function at the UE indicates IDLE, the UE transmits the PUCCH as scheduled.

The same principles may be applied to the Physical Uplink Shared Channel (PUSCH). In one embodiment, the UE follows existing UE procedures for PUSCH transmissions independent of the indication of the CSMA/CA function at the UE for the subframe for which the PUSCH transmission is scheduled. Collisions with on-going transmissions cannot be avoided in general and the PUSCH may not be properly received at the eNodeB.

Alternatively, the UE could base any PUSCH transmissions on the indication of the CSMA/CA function at the UE for the subframe for which the PUSCH transmission is scheduled. If the CSMA/CA function at the UE indicates BUSY, the UE does not transmit on the PUSCH in the subframe under consideration. Otherwise, if the CSMA/CA function at the UE indicates IDLE, the UE transmits the PUSCH as scheduled.

Similar to the case of DFS, hidden stations must be considered. The above solutions for PUSCH and PUCCH transmissions are concerned with the UE behavior in case the CSMA/CA function at the UE indicates BUSY for the subframe for which the PUSCH/PUCCH transmission is scheduled. In case of a hidden station whose waveform is detectable at the UE but not at the eNodeB, the eNodeB may continue scheduling that UE. In case the UE follows regular LTE Rel. 12 operation, this would result in deteriorated performance for both the eNodeB-to-UE link as well as for the link to/from the hidden station, as the respective transmissions would continue to collide potentially creating excessive interference such that reliable communication is no longer feasible or at least, acceptable Quality-of-Service (QoS) could no longer be provided. The opposite case, where the UE does not transmit on PUSCH or PUCCH in a subframe if the CSMA/CA function at the UE indicates BUSY, would equally deteriorate performance due to the dropped packages and HARQ ACK/NACK transmissions in BUSY subframes. In theory, the aforementioned DFS schemes could be reused to allow the UE to inform an eNodeB about the BUSY state of a cell or carrier such that the eNodeB MAC (or RRC) layer could take actions to schedule the UE on a different CC in order to prevent further collisions. In other words, instead of the "DFS event" triggered by the DFS function, the CSMA/CA function would indicate BUSY but otherwise the procedures could be reused. Recall, however, that the time scales for DFS are generally much larger than for LBT as in the case of CSMA/CA. Thus, the present invention provides separate procedures to address hidden stations in the case of CSMA/CA.

An objective of the present invention is to let the UE higher layers inform the eNodeB higher layers about the indication of the UE CSMA/CA function in subframes in which the UE is scheduled for uplink transmissions. Since the UE can always follow existing LTE Rel. 12 specifications in case the UE CSMA/CA function indicates IDLE, this state is not signaled to the eNodeB higher layers. Thus, several embodiments of the present invention provide actions the eNodeB higher layers, such as the eNodeB MAC scheduler, may take in a subframe for which a PUSCH or PUCCH transmission is scheduled and the UE CSMA/CA function indicates BUSY.

Since overall system performance and particularly the perceived user throughput at the UE are maximized the faster the eNodeB can take action by avoiding scheduling the UE on a carrier occupied by a hidden station, it is preferable to either use PHY or MAC layer mechanisms whereby the former have lower latency than the latter. First, in order to reduce latencies, it is assumed that the UE is already configured with up to five serving cells (FIG. 1) on corresponding component carriers. According to the present invention, the serving cells are ordered in ascending order based on the ServCellIndex configured through RRC signaling, however, other orderings and addressing mechanisms are not precluded. Then, the four serving cells, excluding the PCell, are assigned the symbols {00,01,10,11}, such that the serving cell (SCell) with the lowest ServCellIndex corresponds to 00, the serving cell (SCell) with the second lowest ServCellIndex corresponds to 01, and so forth. If less than four SCells are configured the unused symbols, e.g., {01,10,11} in case a single SCell is configured, are reserved. Other mappings are not precluded as they do not alter the invention. In order to guarantee lowest latencies, L1 (PHY) signaling is introduced to inform the eNodeB higher layers about the BUSY indication from the UE CSMA/CA function in a subframe for which a PUSCH or PUCCH transmission is scheduled. More precisely, a new PUCCH format is introduced which is always transmitted on the PCell. The new PUCCH format is identical to the existing PUCCH format 1b, however, instead of representing ACK/ACK, ACK/NACK, NACK/ACK, and NACK/NACK/DTX, the QPSK symbols encode the four serving cell indices {00,01,10,11)}. For purposes of illustration this new PUCCH format is referred to as format 1c. The eNodeB receiver may distinguish between PUCCH formats 1b and 1c through Code Division Multiplexing such that the two PUCCH formats can share the same time and frequency resources. Alternatively, the new PUCCH format can have its own time and frequency resources of the PUCCH region. If PUCCH capacity is not an issue, as is the case for small cells, CDM is preferred for improved spectral efficiency. In case the CSMA/CA function at the UE indicates BUSY in a subframe for which a PUSCH or PUCCH transmission is scheduled the UE does not transmit the PUSCH or PUCCH as scheduled but rather indicates to the eNodeB the BUSY indication via a PUCCH format 1c transmission on the PCell. Several UE behaviors are envisioned, all of which assume that the eNodeB schedules only one SCell at a time in order to prevent any ambiguities at the eNodeB when PUCCH format 1c is received.

In one embodiment, the PUCCH format 1c indicates on which serving cell the BUSY indication occurred. For example, the eNodeB may schedule an uplink transmission in subframe n+k, k>0 via an UL grant in DCI received in subframe n. Shortly before the uplink transmission is scheduled to occur, the CSMA/CA function at the UE begins to sense the medium and indicates to the UE higher layers if it is IDLE or BUSY. If IDLE is indicated, the UE proceeds with the scheduled transmissions as per the received DCI. If BUSY is indicated, the UE ignores the DCI scheduling the uplink transmission under consideration and instead sends a PUCCH format 1c on the PCell encoding in the QPSK symbol the serving cell on which the collision occurred.

Since the eNodeB expected the PUSCH or PUCCH transmission on a particular serving cell, the PUCCH format 1c transmission does not really convey additional information to the eNodeB higher layers. Thus, in a different embodiment, the CSMA/CA function at the UE senses all configured serving cells prior to a scheduled uplink transmission. If IDLE is indicated for the serving cell on which the transmission is scheduled, the UE proceeds with the scheduled transmissions as per the received DCI. If BUSY is indicated, the UE ignores the DCI scheduling the uplink transmission under consideration and instead sends a PUCCH format 1c on the PCell encoding in the QPSK symbol a serving cell on which the CSMA/CA function at the UE indicated IDLE. This, does not guarantee that the corresponding serving cell is IDLE at a future subframe $n+k_2$, $k_2 > k$, but at least the eNodeB does not continue scheduling uplink transmissions on the same serving cell.

Introducing the new PUCCH format 1c requires the eNodeB receiver to monitor for the new PUCCH format. Accordingly, MAC layer procedures may be preferable over the aforementioned PHY procedures. Sending MAC control elements, however, requires the UE to have available uplink resources in addition to the ones it has to leave unused by not transmitting PUCCH or PUSCH because the medium is BUSY. Moreover, the time to prepare the PUSCH transmission carrying the MAC CE may take longer such that the carrier sensing has to occur much earlier than in the case of a new PUCCH format increasing the probability that the CSMA/CA function at the UE indicates IDLE but the medium is BUSY during subframe n+k. Latencies would be further increased if the UE has to send a Scheduling Request (SR) in order to transmit the MAC CE. Nevertheless, MAC layer procedures may still have their merits. For example, one would no longer need the restriction that only a single SCell is scheduled at a time. Rather, one octet (8 bits) in a MAC CE may be used to encode all four SCells simultaneously. Up to four serving (SCells) are again ordered in ascending order based on the ServCellIndex and represented by {00,01,10,11}, i.e., the serving cell (SCell) with the lowest ServCellIndex corresponds to 00, the serving cell (SCell) with the second lowest ServCellIndex corresponds to 01, and so forth. Moreover, the 8 bits in an octet of a MAC CE correspond to the four SCells through the following mapping. The first two bits correspond to the serving cell represented by {00}, the third and fourth bit correspond to the serving cell represented by {01}, the fifth and sixth bit correspond to the serving cell represented by {10}, and the last two bits correspond to the serving cell represented by {11}, although other mappings and orderings are not precluded. If the bits at a position correspond to the position itself, this indicates that the corresponding serving cell was indicated as IDLE. Otherwise, the indication was BUSY and the two bits indicate to which serving cell the eNodeB should switch. In other words, the bit position in the octet encodes for which serving cell the bits at that position belong and the bits themselves, encode the same information transmitted on the PUCCH format 1c above for a single cell. For instance, the octet {00010011} means that the first, second, and forth serving cell were IDLE whereas transmissions on the third serving cell should be transmitted on the first serving cell.

Still further, while numerous examples have thus been provided, one skilled in the art should recognize that various modifications, substitutions, or alterations may be made to the described embodiments while still falling within the inventive scope as defined by the following claims. Other combinations will be readily apparent to one of ordinary skill in the art having access to the instant specification.

What is claimed is:

1. A method of operating a communication system on a shared frequency spectrum, comprising:
   initializing a user equipment (UE) on a primary serving cell (PCell) operating on a licensed frequency spectrum;
   transmitting data from the UE to at least one secondary serving cell (SCell) operating on the shared frequency spectrum;
   monitoring the at least one SCell by the UE to determine a BUSY status;
   transmitting to a base station on the at least one SCell if it is not BUSY; and
   reporting the BUSY status of the at least one SCell to the base station if it is BUSY.

2. The method of claim 1, wherein the shared frequency spectrum is an unlicensed frequency spectrum.

3. The method of claim 1, comprising accessing the shared frequency spectrum with carrier sense multiple access with collision avoidance (CSMA/CA).

4. The method of claim 1, comprising reporting the BUSY status in an uplink control information packet on a Physical Uplink Control Channel of the PCell.

5. The method of claim 1, wherein the BUSY status is transmitted on a Physical Uplink Control Channel resource that is semi-statically configured by radio resource control signaling from the base station.

6. The method of claim 1, wherein the BUSY status is transmitted on a Physical Uplink Control Channel resource that is dynamically signaled by a downlink control information packet from the base station.

7. The method of claim 1, comprising:
   determining a status of the at least one SCell is BUSY;
   determining an IDLE status of at least another secondary serving cell; and
   transmitting an identity of the at least another secondary serving cell on a Physical Uplink Control Channel of the PCell to the base station.

8. A method of operating a wireless communication system on a shared frequency spectrum, comprising:
   initializing a user equipment (UE) on a primary serving cell on a licensed frequency spectrum;
   configuring the UE to communicate with a secondary serving cell (SCell) on the shared frequency spectrum; and
   receiving at the UE a radio resource management (RRM) report corresponding to the SCell if a primary user is detected on the shared frequency spectrum.

9. The method of claim 8, wherein the shared frequency spectrum is an authorized shared access (ASA) frequency spectrum, and wherein the primary user has a higher access priority than the SCell.

10. The method of claim 8, wherein the RRM report is periodic.

11. The method of claim 8, wherein the RRM report indicates a dynamic frequency selection (DFS) event.

12. An apparatus, comprising:
    circuitry for initializing a user equipment (UE) on a primary serving cell (PCell) operating on a licensed frequency spectrum;
    circuitry for transmitting data from the UE to at least one secondary serving cell (SCell) operating on a shared frequency spectrum;
    circuitry for monitoring the at least one SCell by the UE to determine a BUSY status;
    circuitry for transmitting to a base station on the at least one SCell if it is not BUSY; and
    circuitry for reporting the BUSY status of the at least one SCell to the base station if it is BUSY.

13. The apparatus of claim 12, wherein the shared frequency spectrum is an unlicensed frequency spectrum.

14. The apparatus of claim 12, comprising accessing the shared frequency spectrum with carrier sense multiple access with collision avoidance (CSMA/CA).

15. The apparatus of claim 12, comprising reporting the BUSY status in an uplink control information packet on a Physical Uplink Control Channel of the PCell.

16. The apparatus of claim 12, wherein the BUSY status is transmitted on a Physical Uplink Control Channel resource that is semi-statically configured by radio resource control signaling from the base station.

17. The apparatus of claim 12, wherein the BUSY status is transmitted on a Physical Uplink Control Channel resource that is dynamically signaled by a downlink control information packet from the base station.

18. The apparatus of claim 12, comprising:
    determining a status of the at least one SCell is BUSY;
    determining an IDLE status of at least another secondary serving cell; and
    transmitting an identity of the at least another secondary serving cell on a Physical Uplink Control Channel of the PCell to the base station.

19. An apparatus, comprising:
    circuitry for initializing a user equipment (UE) on a primary serving cell on a licensed frequency spectrum;
    circuitry for configuring the UE to communicate with a secondary serving cell (SCell) on a shared frequency spectrum; and
    circuitry for receiving at the UE a radio resource management (RRM) report corresponding to the SCell if a primary user is detected on the shared frequency spectrum.

20. The apparatus of claim 19, wherein the shared frequency spectrum is an authorized shared access (ASA) frequency spectrum, and wherein the primary user has a higher access priority than the SCell.

21. The apparatus of claim 19, wherein the RRM report is periodic.

22. The apparatus of claim 19, wherein the RRM report indicates a dynamic frequency selection (DFS) event.

* * * * *